United States Patent [19]

Rohrle et al.

[11] Patent Number: 4,883,156

[45] Date of Patent: Nov. 28, 1989

[54] TORSION DAMPING DEVICE FOR A DISC TYPE FRICTION CLUTCH FOR AN AUTOMOBILE VEHICLE

[75] Inventors: Dieter Rohrle, Montmorency; Michel Graton, Paris; Philippe Lhermitte, Senlis, all of France

[73] Assignee: Valeo, Paris, France

[21] Appl. No.: 178,983

[22] Filed: Apr. 7, 1988

[30] Foreign Application Priority Data

Apr. 7, 1987 [FR] France ................................ 87 04882

[51] Int. Cl.⁴ ............................................. F16D 3/66
[52] U.S. Cl. ................................... 192/106.2; 464/63; 464/68
[58] Field of Search ......................... 192/106.2, 106.1; 464/63, 68

[56] References Cited

U.S. PATENT DOCUMENTS

| | | | |
|---|---|---|---|
| 2,674,683 | 4/1954 | Thelander | 192/106.2 X |
| 4,212,380 | 7/1980 | Billet | 192/106.2 |
| 4,433,771 | 2/1984 | Caray | 192/106.2 |
| 4,537,296 | 8/1985 | Lech et al. | 192/106.2 |
| 4,549,641 | 10/1985 | Ootani et al. | 192/106.2 |
| 4,557,702 | 12/1985 | Takeuchi | 192/106.2 X |
| 4,591,348 | 5/1986 | Takeuchi et al. | 192/106.2 X |
| 4,596,535 | 6/1986 | Ooga | 464/68 |
| 4,603,767 | 8/1986 | Blond | 192/106.2 |
| 4,684,007 | 8/1987 | Maucher | 464/68 X |
| 4,688,666 | 8/1987 | Blond | 192/106.2 |
| 4,700,821 | 1/1987 | Maucher et al. | 192/106.2 |
| 4,700,822 | 10/1987 | Maucher et al. | 192/106.2 |

FOREIGN PATENT DOCUMENTS

| | | |
|---|---|---|
| 0209316 | 1/1987 | European Pat. Off. . |
| 3545231 | 6/1987 | Fed. Rep. of Germany ... 192/106.2 |
| 3545723 | 6/1987 | Fed. Rep. of Germany ... 192/106.2 |
| 2386729 | 11/1978 | France . |
| 2573827 | 5/1986 | France . |
| 2573830 | 5/1986 | France . |
| 2167526 | 5/1986 | United Kingdom . |
| 2175370 | 11/1986 | United Kingdom . |

Primary Examiner—Rodney H. Bonck
Attorney, Agent, or Firm—Charles E. Brown; Charles A. Brown

[57] ABSTRACT

The invention concerns a torsion damper, especially for a disc type friction clutch for an automotive vehicle. The damper comprises a lining support plate and a hub which are movable angularly with respect to each other. The support plate and the hub are coupled together by two torsion damping devices, one of which comprises guide rings and a damper plate mounted on the hub and centered with respect to the guide rings by means of a bush surrounding the hub and having a face plate with axially extending centering pins or the like, engaged in corresponding apertures in the damper plate or face plate. The invention is especially applicable to the automobile field.

11 Claims, 5 Drawing Sheets

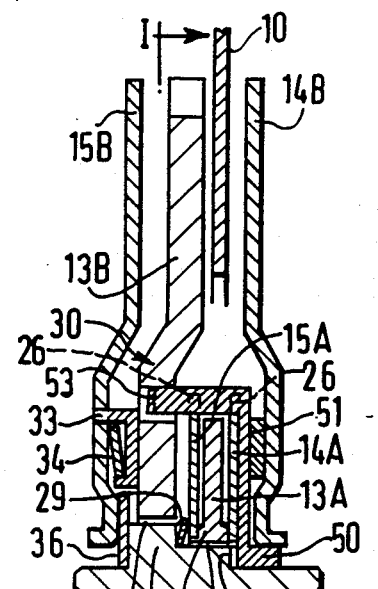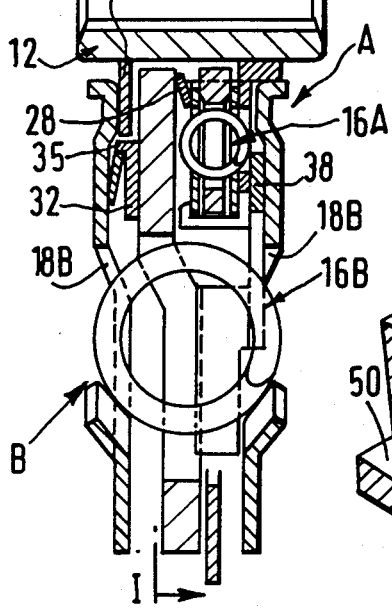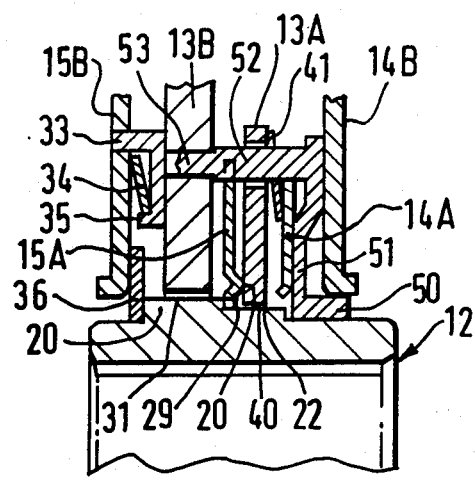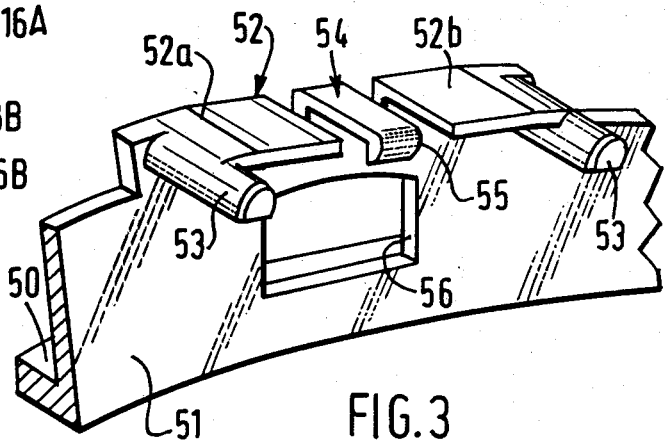
FIG.2
FIG.4
FIG.3

TORSION DAMPING DEVICE FOR A DISC TYPE FRICTION CLUTCH FOR AN AUTOMOBILE VEHICLE

BACKGROUND OF THE INVENTION

1. Field of the Invention

The present invention relates to a torsion damper, especially a disc type friction clutch for an automotive vehicle, of the kind comprising a lining support plate and a hub which are movable angularly with respect to each other within the limits of a predetermined angular displacement, the support plate and the hub being coupled together by two torsion damping devices arranged to act successively, one of which (referred to as the first device or pre-damper), is weaker than the other (referred to as the second device or main damper) which comprises a damper plate mounted on the hub with a clearance permitting the said angular displacement, two rings, referred to as guide rings, fixed with respect to each other and disposed on either side axially of the damper plate, and a plurality of resilient angular displacement means interposed circumferentially between the damper plate and the rings, and further comprising associated friction means.

2. Description of the Prior Art

French Patent Application No. 2 386 729 describes a damper with a predamper comprising a resilient means disposed within the zone of co-operation provided between the hub and the damper plate of the main damper. A bush mounted on the hub, and rotatable with one of the guide rings, ensures only that the guide rings are centred with respect to the hub.

The Certificate of Addition No. 2 570 147 to French Patent Application No. 2 551 813 discloses a pre-damper comprising a damper plate, two guide rings disposed axially on either side of the damper plate, and resilient means interposed circumferentially between the damper plate and the rings, the said plate being rotatable with the hub so that the guide rings are rotatable with the damper plate of the main damper.

Coupling between the pre-damper and the main damper is obtained by means of cylindrical members projecting from one guide ring of the pre-damper and engaged in recesses in the damper plate of the main damper. These members ensure positioning of the guide rings of the pre-damper with respect to the damper plate of the damper, but they do not ensure that the said damper plate is centred with respect to the hub.

In European Patent Application No. 0 209 316, the pre-damper includes wedging means, and a bearing is provided to centre the damper plate on the hub.

For this purpose axial elements for centring the damper plate with respect to the hub are provided, projecting axially between the damper plate and a face plate fixed with respect to the bearing. These elements are fixed with respect to the face plate.

During operation in all these cases, radial forces will always develop within the damper, so that imbalance phenomena, which contribute to the incidence of vibration, cause an increase in wear in the damper components. In addition, these radial forces do not lead to good friction control within the pre-damper, especially in connection with the bush.

An object of the present invention is to reduce these disadvantages and therefore to create an arrangement allowing the radial forces developing within the pre-damper, and wear in the damper, to be reduced while allowing good friction control in the pre-damper and obtaining other advantages.

SUMMARY OF THE INVENTION

According to the invention, a torsion damper of the kind described above is characterised in that the outer peripheral surface of the bush is in frictional contact with the inner peripheral edge of one of the guide rings of the main damper.

A feature of the invention is that the damper plate of the main damper is centred with respect to the guide rings of the latter, in such a way that radial forces are reduced within the main damper, as is wear, especially between the resilient means and the guide rings. The life of the damper is thus increased.

Preferably, the inside edge of the guide ring in question is bent towards the outside, so as to increase the contact area of the said ring with the bush.

The bush may be freely mounted with respect to the hub with a clearance for centring. It will be appreciated that the invention allows improved friction control to be obtained between the bore of the bush and the outer circumferential surface of the hub.

Advantageously, a predetermined clearance, permitting radial displacement of the hub with respect to the bush, exists between the outer circumferential surface of the hub and the bore of the bush.

Experience has shown in an unexpected way that "dead point" noise, especially when the engine is in a slow running mode, are reduced.

It is basically the means for relative rotational displacement, providing engagement with a clearance which, when a torque is applied, ensure that the hub is centred with respect to the damper plate of the main damper, in spite of the fact that the centring is fundamentally incomplete. To be more precise, for example in the case of a disc-type friction clutch, during engagement of the clutch, when the friction linings carried by the lining support plate are not totally compressed between the pressure plate and the reaction plate, the damper plate on the hub can become centred with respect to the hub because of the relative rotational displacement means with its clearance, this typically taking the form of splines of trapezoidal shape.

Indirect centring is thus achieved with respect to the guide rings, the said hub being so mounted as to float with respect to the damper plate, to the extent that the clearance of the relative rotational displacement means provided between the plate and the hub has not been taken up. It will be appreciated that the floating mounting of the hub allows friction between the bush and the hub to be well controlled, since it is eliminated.

Again, in another advantageous arrangement the face plate has axially extending spacing elements, the end surfaces of which make contact with the adjacent face of the damper plate of the main damper.

Each spacing element may be divided into two parts spaced from each other, each part being associated with a centring element of the main damper.

As a result of these arrangements, it is possible to mount the pre-damper between the face place and the damper plate of the main damper, in the space bounded by the spacing element.

It is also possible to create a unitary assembly consisting of the pre-damper and the bush, by means of resilient claws carried by the face plate.

The spacing elements may serve as a centring means for one of the parts of the pre-damper, for example for the damper plate on the hub or for the guide rings.

BRIEF DESCRIPTION OF THE DRAWINGS

FIG. 2 is an axial cross-section taken on the bent line II—II of FIG. 1;

FIG. 3 is a perspective scrap view of the centring bush of FIG. 1 according to the invention;

FIG. 4 is a view similar to part of FIG. 2, in another embodiment;

DESCRIPTION OF THE PREFERRED EMBODIMENTS

In the embodiments shown, the friction disc for a clutch assembly comprises a support plate 10 for friction linings (seen in FIG. 7) and a hub 12, which are movable angularly with respect to each other within the limits of a predetermined angular displacement.

The lining support plate is adapted, through its friction linings, to be gripped between two clutch plates arranged to rotate with the crankshaft of the vehicle, while, by means of its hub 12, it is fixed on, and rotates with, the input shaft of the vehicle gearbox.

The lining support plate and the hub 12 are coupled together by two successively acting torsion damping devices, one of which, namely the first device or pre-damper A, is weaker than the other one B, namely the second device or main damper.

Figure 1:
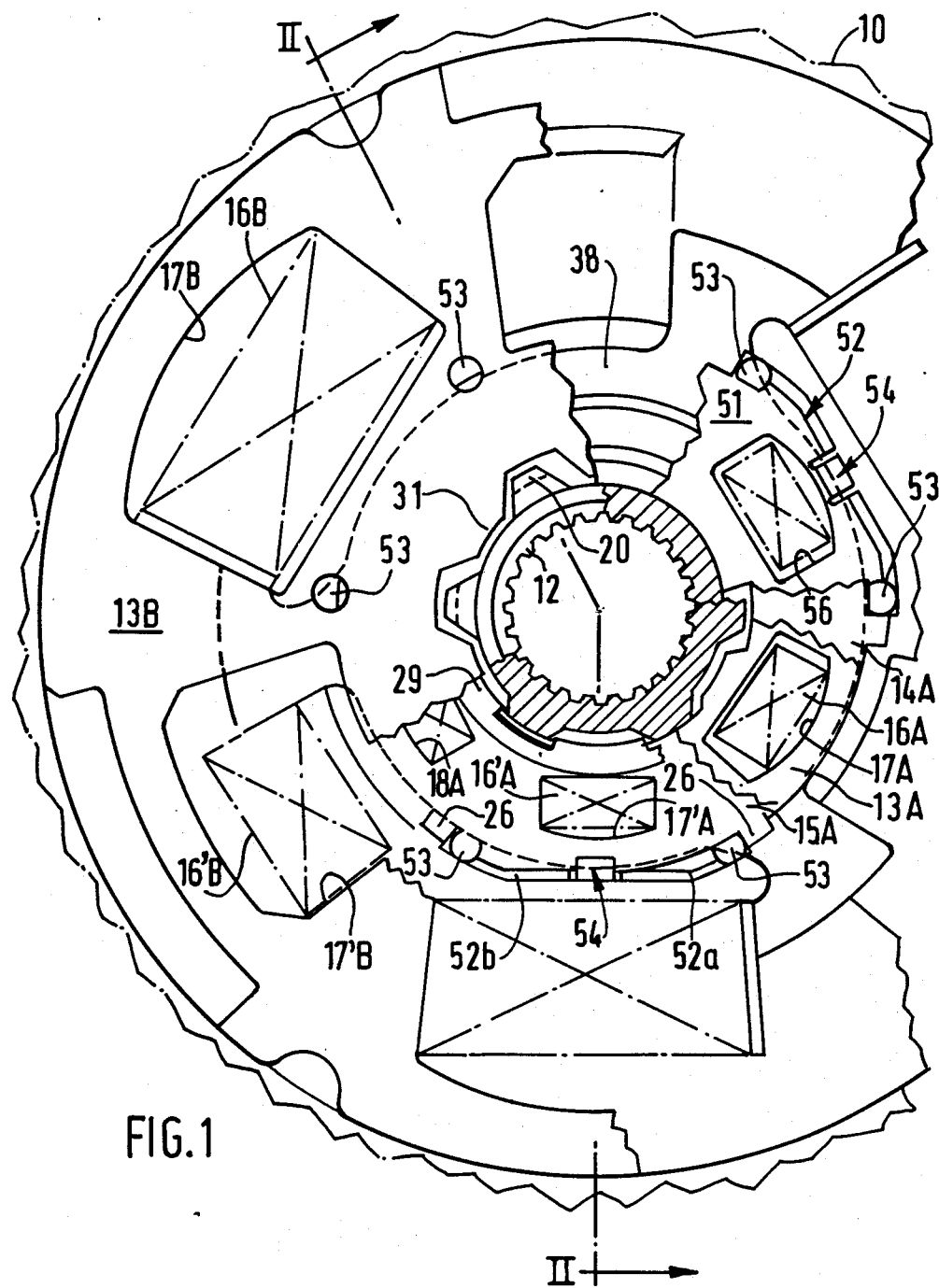
FIG. 1 is with cut away portions, a sectional view of a torsion damper in accordance with the invention, taken on the line I—I of FIG. 2.

In the embodiment of FIGS. 1 to 3, the pre-damper A comprises a damper plate 13A rotating with the hub 12, two metal guide rings 14A, 15A, which are free with respect to the hub 12 and are respectively disposed axially on either side of the damper plate 13A, resilient means 16, 16'A interposed between the damper plate and the rings, and variable biasing means for holding the components frictionally together.

The damper plate 13A, which may advantageously be of plastics material, for example reinforced with glass fibre, and the rings 14A, 15A extend endlessly within a zone around the middle part of the hub 12.

On its outside periphery, the hub 12 has, extending axially over part of its length, splines 20 which, to the right of the plate 13A and extending from a transverse shoulder 29, are of reduced radial height; and the damper plate 13A is formed on its internal periphery with complementary splines 22, through which it is in engagement, without clearance, with that portion of the splines 20 which is of reduced height. The plate 13A has an enlarged base 13 forming a spacer for the rings 14A, 15A, which bear against it.

The pre-damper A is here provided with two arrays of three resilient means 16A, 16'A, interposed circumferentially between the damper plate 13A and the rings 14A, 15A (FIG. 1). These resilient means comprise helical springs, of relatively low stiffness, which are individually housed partly in openings 17A, 17'A in the damper plate 13A, and partly in openings 18A in the rings 14A, 15A.

A bush 50, preferably moulded in plastics material, is mounted on and surrounds the hub 12. This bush 50 has, towards one end, a face plate 51 which extends radially and has, extending from its outer periphery in an axial direction, spacing flanges 52 which are extended by centring pins 53 adapted for centring the damper plate of the main damper with respect to the guide rings of the main damper, as will be described later herein. In this example the bush 50 is freely mounted on the hub with a clearance for centring purposes.

Each spacing flange 52 (FIG. 3) is divided into two parts 52a, 52b, spaced from each other, each part being associated with one centring pin 53. In the space thus defined there is accommodated a resilient claw 54, axially orientated and extending from the outer edge of the face plate 51, and which by means of its hook shaped free end 55 is able to secure the opposite guide ring 15A by latching on to the latter, which allows a pre-assembled unitary assembly to be obtained comprising the pre-damper A, spaced by the damper plate 13A, and the bush 50. This assembly is then suitable to be mounted on the splines 20. Each spacing flange 52 and each claw 54 extends radially outside the damper plate 13A. The spacing flanges 52 are for example three in number, regularly spaced apart circumferentially. After assembly, a clearance exists between the hooks 55 and the ring 15A.

Each ring 14A, 15A is extended at its outside edge, and respectively on either side of each spacing flange 52, by two tabs 26 which couple the rings and face place 51 for rotation together. The outer peripheral surfaces of the guide rings 14A, 15A make contact with the inner peripheral surface of the spacing flanges 52, which thus also ensures that these rings are centred with respect to the hub 12.

The variable friction biasing means, for holding the components of the pre-damper A frictionally together, comprise a resilient annular means 28 mounted between the transverse shoulder 29 of the hub 12 and the guide ring 15A adjacent to this shoulder 29. The resilient means 28 here consists of a Belleville washer, which is coaxial with the hub 12 and which biasses the assembly of the pre-damper A towards the face plate 51, with the guide ring 14A bearing against the face plate. Mounting of the washer 28 can be obtained by means of notches formed in its inner edge and engaged on the splines 20 of the hub 12 to rotate therewith.

In the face plate 51 of the bush 50 are thrust faces 56 of the openings 18A for accommodating the springs.

The main damper 18 itself comprises a damper plate 13B and two guide rings 14B, 15B disposed respectively on either side of the latter.

Two groups of three resilient means 16B, 16'B are interposed circumferentially between the damper plate 13B and the rings 14B, 15B (FIG. 1). These resilient means 16B, 16'B, of greater stiffness than the resilient means 16A, 16'A, consist of helical springs, individually mounted partly in openings 17B, 17'B of the damper plate 13B and partly in openings 18B of the rings 14B, 15B.

The profile of the damper plate 13B in axial cross-section provides the space required to accommodate the pre-damper A between it and the ring 14B. This space is obtained in this case by a double bend 30 which is situated in the zone of contact with the springs 16B, 16'B on their radially inward side.

The damper plate 13B has on its internal periphery splines 31 which engage, with the prescribed angular clearance, on the higher portion of the splines 20 of the hub 12 (FIG. 1), so as to constitute relative rotational displacement means. It will be noted that the splines 31 and 20 are of trapezoidal form.

The damper plate 13B is mounted on the hub 12 in such a way that the end surface of each spacing flange 52 of the face plate 51 makes contact with the adjacent wall of the damper plate 13B, so that the centring pins 53 engage in corresponding holes in the plate 13B, which is thus centred with respect to the guide rings 14B, 15B and secured for rotation with the face plate 51 and bush 50. To be more precise, the outer peripheral surface of the bush 50 is in frictional contact with the inner edge of the ring 14B, while the bore of the bush is in frictional contact with the outer periphery of the hub 12. As a result, the damper plate 13B and hub 12 are centred with respect to the guide rings 14B, 15B, and friction between the bush 50 and hub 12 is more effectively controlled.

In the space situated between the guide ring 15B and the main damper plate 13B, there is disposed a frictional thrust ring 32 which has axial projections 33 slidably engaged in corresponding holes provided in the ring 15B.

A biasing ring 34 of the main damper is mounted between the ring 32 and the guide ring 15B. In this example it consists of a Belleville washer centred by means of a shoulder 35, which is provided near the inner periphery of the ring 32.

This washer 34 biasses the damper plate 13B towards the face plate 51 so as to ensure contact between the spacing flanges 52 and the plate 13B. It exerts a greater force than the washer 28, but has no effect on the action of the damper plate 13A because of the flanges 52.

Near its inner end, the ring 15B bears against one face of a friction ring 36, mounted on the hub 12 and having its other face abutting against the transverse terminal shoulder 37 of the portion of the splines 20 of larger radius.

In the space situated between the other guide ring 14B and the face plate 51 of the bearing 50, there is disposed a friction ring 38 which has projections co-operating with the spring 16B.

The inner edge of the guide ring 14B, in the form of a crown, is bent axially outwards so as to increase its radial stability, and is in contact with the outer peripheral surface of the bush 50.

The guide rings 14B, 15B are joined to each other and to the lining support plate 10 by conventional means such as tie bars (not shown).

In the alternative embodiment shown in FIG. 4, the spacers 52 of the face plate 51 are in cylindrical form and bridge the damper plate 13A, to terminate in the pins 53 for coupling in simultaneous rotation, and centring, the damper plate 13B of the main damper. These pins 53, having a diameter smaller than that of the spacers 52, are engaged in holes in the damper plate 13B, and together with these last they define shoulders against which the adjacent wall of the damper plate 13B is urged under the biasing force of the spring 34.

The guide ring 15A bears through its inner edge against the shoulder 29. On the side opposite to the shoulder 29, the ring 15A has a bead 40 whereby it makes contact with the adjacent wall of the damper plate 13A.

The ring 14A bears through one of its faces against the face plate 51, and a resilient variable frictional biasing means is mounted between the other face of the ring 14A and the damper plate 13A. This resilient means 41, having a lower stiffness than the washer 34, here comprises a Belleville washer having slots for accommodating the spacers 52, which thus ensure that the ring 41 is centred. This ring 41 biasses, on the one hand the ring 14A into engagement against the face plate 51, and on the other hand the ring 15A against the shoulder 29 via the damper plate 13A. As before, the guide rings 14A, 15A are made to be rotatable with the face plate 51 of the bush 50 by tabs 26 located on either side of the spacers 52, which also ensure that these rings are centred with respect to the hub 12.

In every case, the operation of the torsion damper can be described as follows, considering in succession the modes of transmission for low, high and very high torques.

In the low torque mode, for instance at the dead point position of the gearbox of an automobile, in which the reaction torque encountered by the hub 12 is in the neighbourhood of zero, the motion transmitted by the guide rings 14B–15B is reproduced more or less directly in the damper plate 13B, the stiffness of the springs 16B, 16'B being of an order of magnitude higher than the forces brought into play at this stage. Within the limits of the angular variation provided between the main damper plate 13B and the hub 12, the movement is then transmitted via the said damper plate, through the coupling pins 53 to the guide rings of the pre-damper, which in turn transmit it to the damper plate 13A after first compressing the springs 16A having the lowest stiffness, the said damper plate 13A (or 40) being fixed with respect to the hub 12.

Oscillations that may develop within the pre-damper are damped by virtue of the friction between the biasing spring 28 (or 41) between the damper plate and one of the guide rings of the pre-damper, by friction between the bush 50 and the hub 12, and also between the ring 36 and the ring 15B, the rings 34 and face plate 51 being inactive.

After the clearance between the splines 31 and 20 has been taken up, the high torque mode is initiated.

In this mode, it is the rings 16B, mounted without clearance in the openings 17B and of lower stiffness than those in the group 16'B, that become compressed to an extent appropriate to the torque which is to be transmitted, and no further relative movements occur in the pre-damper. Oscillations which might tend to arise within the main damper after taking into account frictional action at the level of the ring 36 and the bore of the bush 50, are damped on the one hand by the frictional action of the damper plate 13B on the washer 34, and on the other hand by friction between the guide ring 14B, face plate 51 and bush 50. During this phase, the ring 38, by virtue of its projections (FIG. 1), may be engaged by one of the radial faces of the openings 18B in the rings 14B, 15B and can serve as a friction means by contact, for the guide ring 15B.

When the torque to be transmitted is further increased, and after the clearance with which the springs 16'B are mounted in the openings 17'B has been taken up, the mode of very high torques, in which the springs 16'B are operative, is initiated.

Figure 5:
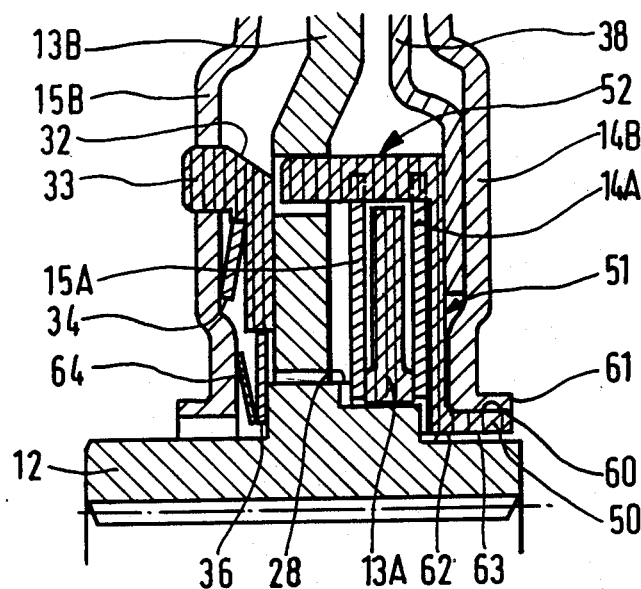
FIG. 5 is a view similar to FIG. 4, in yet another embodiment.
Figure 6:
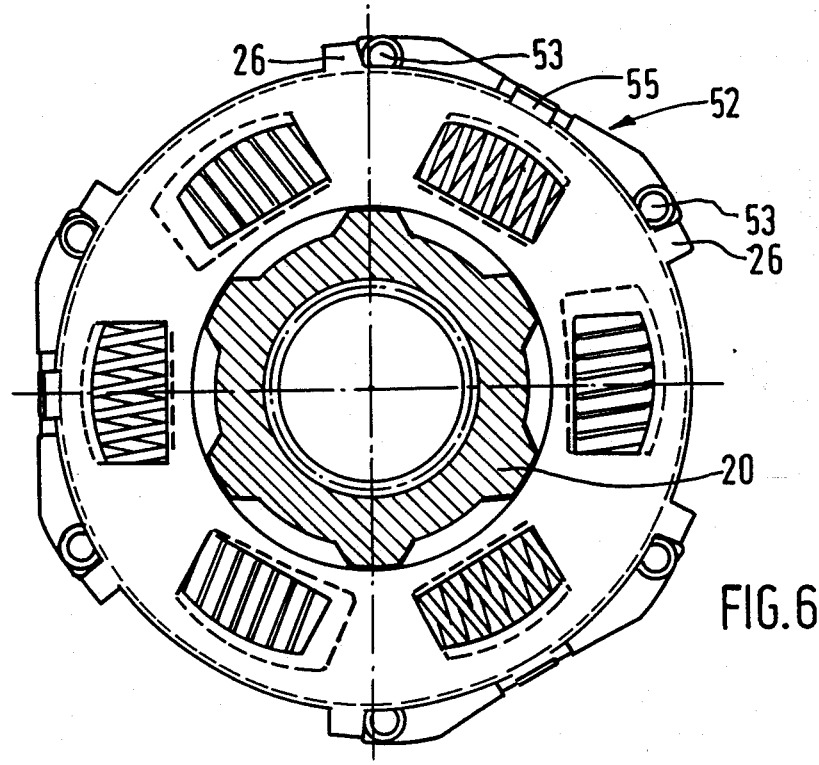
FIG. 6 is a view in elevation of the pre-damper shown in FIG. 5.

In the embodiment of FIGS. 5 and 6, similar to the embodiment of FIGS. 1 to 3, the outer peripheral surface of the bush 50 is in frictional contact with the inner edge 61 of the guide ring 14B, while there is a predetermined radial clearance between the outer periphery 62 of the hub 12 and the bore 63 of the bush 50. The said bush 50 is thus mounted around the hub 12 while being centred by the rings 14B, 15B. It will be noted that the predetermined clearance is so chosen as to allow the hub 12 to be displaced radially with respect to the damper plate 13B, and that it is therefore larger than the centring clearance with which the bush is carried for free movement on the hub in the embodiments previously described herein. The hub 12 may thus be displaced radially with respect to the bush.

By virtue of this arrangement, "dead point" noise, especially when the engine is in a slow running mode, are reduced. It is the trapezoidal splines 31, 20 (or teeth), constituting relative rotational displacement means between the hub 12 and damper plate 13B, that ensure, when a torque is applied, that the hub 12 is centred with respect to the damper plate 13B of the main damper, in spite of the fact that the said centring is fundamentally incomplete. For instance, when the clutch is being engaged during slow running, since the friction linings on the lining support plate 10 are not fully compressed between the pressure plate and the reaction plate, having regard to the applied torque the splines 31, 20 of trapezoidal form make contact with each other and the main damper becomes centred with respect to the hub and thus to the input shaft of the gearbox. After compression of the friction linings on the support plate 10, the main damper will be locked up for rotation with the crankshaft, and will as a consequence remain correctly centred. The result of this is that uncontrolled frictional motion, especially in relation to the bore of the bush 50, is eliminated, which allows improved control of frictional movement to be achieved in relation to the pre-damper.

Indirect centring is thus obtained with respect to the guide rings 14B, 15B, the said hub 12 being mounted so as to float in relation to the damper plate 13B to the extent that the clearance of the relative rotational displacement means has not been taken up. It will be noted that the bore 63 no longer serves as a friction ring.

In this embodiment, the metal ring 36 is subjected to the action of a Belleville washer 64, inclined in the reverse direction to the ring 34, and is centred on the coupled for rotation with the ring 32, which is of increased thickness and preferably of plastics material. To be more exact, the ring 36 is centred by the inner peripheral surface of the ring 32, and is provided on its outer periphery with teeth engaging within complementary recesses in the bore of the ring 32, radially disposed below projections 33 (which in this case are bosses). The radial clearance between the outer periphery 62 and the ring 32 will be noticed, this being such that the hub 12 is mounted so as to be fully floating with respect to the damper plate 13B to the extent that the clearance between the splines 31, 20 has not been taken up.

It is also to be noted that the spring 28 consists of a corrugated ring, and that the inner edge 61, bent outwardly, constitutes an axial flange as in FIG. 2.

Figure 7:
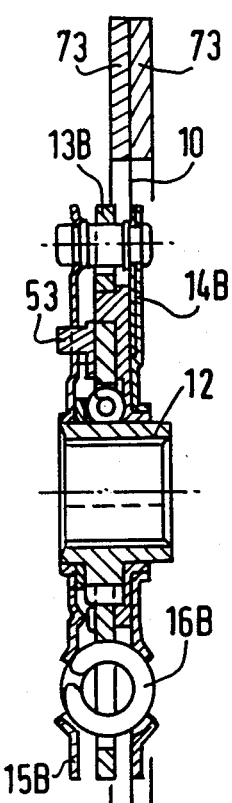
FIG. 7 is a view in axial cross-section, of a friction clutch in another variation.
Figure 8:
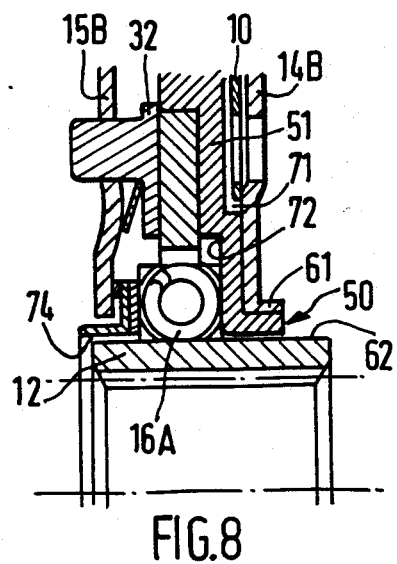
FIG. 8 is a view on a larger scale corresponding to the upper central portion of the friction clutch of FIG. 7.
Figure 9:
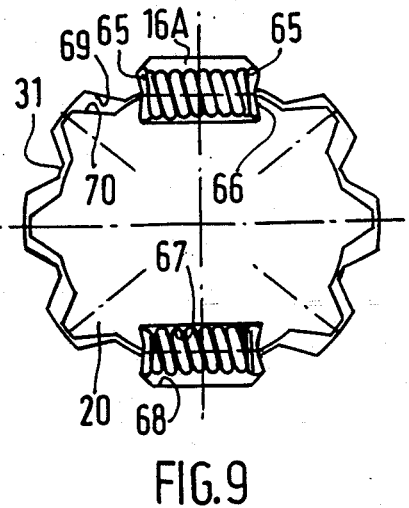
FIG. 9 is a simplified detail view of a relative rotational displacement means with its clearance.
Figure 11:
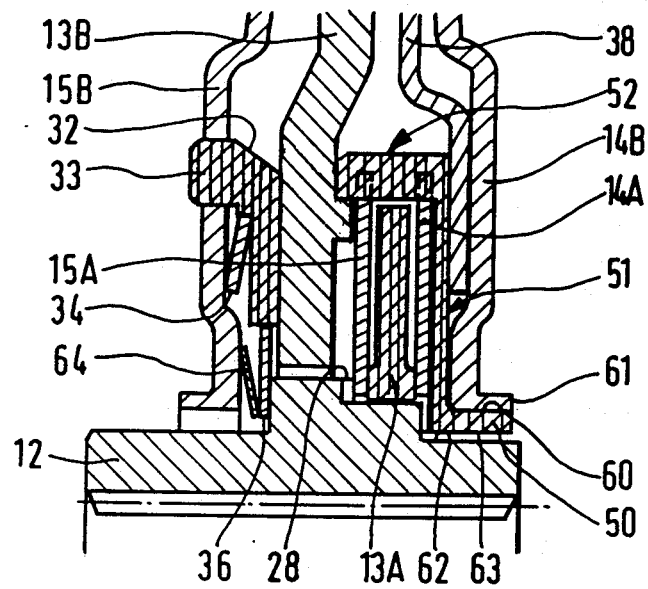
FIG. 11 is a view similar to FIG. 10, in a further variation.

In the embodiment of FIGS. 7 to 9, the pre-damper A is inserted between the inner periphery of the damper plate 13B and the outer periphery of the hub 12. To this end, the damper plate 13B is mounted rotatably with respect to the hub 12 against springs 16A which are mounted between end plates 65, having a rear surface 66 comprising two surfaces inclined to each other, in notches 67, 68 formed respectively in the damper plate 13B and the hub 12, interrupting the clearance between the splines 31, 20.

From FIG. 9 the inclined flanks of the trapezoidal splines 30, 20 can be seen. It is after the clearance has been taken up as in FIG. 5, by mutual co-operation of the mating flanks 69, 79, that centring of the damper plate 13B with respect to the hub 12 is ensured, the hub being thus indirectly centred with respect to the rings 14B, 15B.

The face plate 51 has no spacers, and carries only pins 53 for centring the damper plate 13B. This face plate 51 has rebates 71, 72 for the accommodation of, respectively, the support plate 10 carrying the friction linings seen here at 73, and the extra thickness 20 of the hub. These rebates are staggered axially and radially, the rebate 72 being designed having regard to the possible radial displacement of the floating hub 12.

It will be noted that the ring 36 is part of a conventional bearing of plastics material with an axial sleeve portion 74 coupled for rotation with the ring 15B by bosses (not shown) engaging in apertures in the ring 15B. A radial clearance is also provided between this ring 36 and the hub 12.

The lining support plate 10 may of course be associated with any engine component whatever, and only constitutes one single member with one of the guide rings of the main damper.

The bush 50, integral with the face plate 51, is advantageously of plastics material, usually reinforced with glass fibre, and is adapted for the associated springs of low stiffness 16A, 16'A so as not to obscure their action; it is made by moulding.

The invention is clearly not limited to the embodiments described; in particular, the centring pins may engage with a defined circumferential clearance in the apertures of the main damper plate, and it is also possible to envisage a structural inversion with regard to the centring elements, that is to say one in which the hub plate of the main damper has axially extending projections, pins or the like adapted to co-operate with the inner or outer periphery of the spacers of the bush, so as to ensure that the damper plate is centred with respect to the face plate and with respect to the guide rings. In every case, it is necessary to provide elements for axially centring the damper plate of the main damper, extending axially between the damper plate 13B and the face plate 51.

Figure 10:
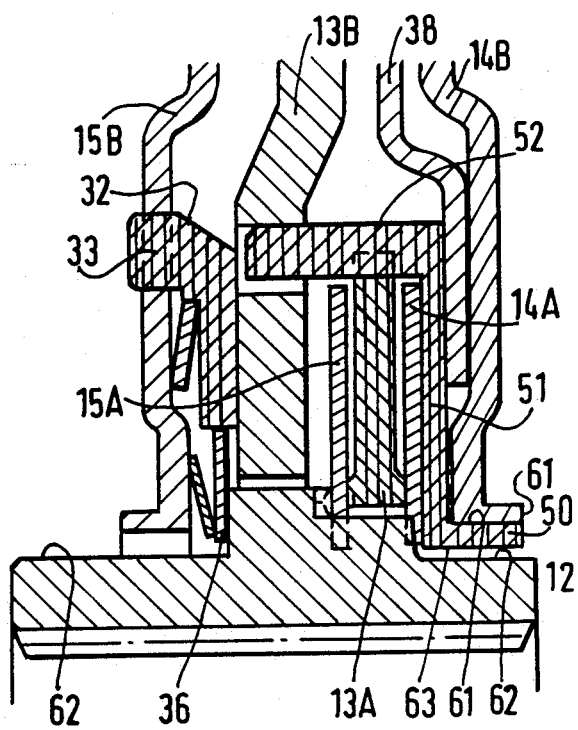
FIG. 10 is a view similar to FIG. 4, in a further variation.

Finally, in FIG. 10, the guide rings 14A, 15A of the pre-damper may be coupled for rotation with the hub 12 by means of splines, similar to the splines 22 and complementary to the splines 20, while the damper plate 13B may be coupled for rotation with the spacers 52 by means of tabs similar to the tabs 26.

In this case, an additional friction effect takes place between the face plate 51 and the ring 14A with low torques. This arrangement permits, on the one hand, compensation for friction losses in regard to the bore of the bush 50, and on the other hand, the mounting of the spring 28, which is trapped between two members rotatable together, in such a way that the spring 28 can be mounted so as to be freely movable on the hub. This supplementary friction effect permits, for a given friction force, a reduction in the axial force exerted by the springs 28.

What is claimed is:

1. A torsion damper for a disc type friction clutch for an automotive vehicle, of the kind comprising a lining support plate and a hub which are movable angularly with respect to each other within the limits of a predetermined angular displacement, the support plate and the hub being coupled together by two torsion damping devices arranged to act successively, one of which, namely a first device or pre-damper, is weaker than the other, namely a second device or main damper; comprising a damper plate mounted on the hub with a clearance permitting said angular displacement, two guide rings, fixed with respect to each other and disposed axially on either side of the damper plate, and a plurality of resilient angular displacement means interposed circumferentially between the damper plate and the rings; and further comprising associated friction means, in which said damper there is provided a centring means comprising a bush surrounding the hub, and a face plate fixed with respect to the bush and extending radially intermediate one of the guide rings and the damper plate of the main damper, axial elements being provided for centring the damper plate and projecting axially between the damper plate and the face plate, wherein the outer peripheral surface of the bush is in frictional contact with the inner peripheral edge of said one of the guide rings of the main damper, the face plate also having axially extending spacers the end surfaces of which make contact with the adjacent face of the damper plate of the main damper.

2. A damper according to claim 1, wherein each spacer is divided into two parts spaced from each other, each part being associated with an axial element for centring the damper plate of the main damper.

3. A damper according to claim 1, wherein the main damper plate has axially extending projections, pins or the like, adapted to co-operate with the periphery of the spacers of the bush so as to ensure that the said damping plate is centered.

4. A torsion damper for a disc type friction clutch for an automotive vehicle, of the kind comprising a lining support plate and a hub which are movable angularly with respect to each other within the limits of a predetermined angular displacement, the support plate and the hub being coupled together by two torsion damping devices arranged to act successively, one of which, namely a first device or pre-damper, is weaker than the other, namely a second device or main damper; comprising a damper plate mounted on the hub with a clearance permitting said angular displacement, two guide rings, fixed with respect to each other and disposed axially on either side of the damper plate, and a plurality of resilient angular displacement means interposed circumferentially between the damper plate and the rings; and further comprising associated friction means, in which said damper there is provided a centring means comprising a bush surrounding the hub, and a face plate fixed with respect to the bush and extending radially intermediate one of the guide rings and the damper plate of the main damper, axial elements being fixed with respect to the face plate and provided for centring the damper plate and projecting axially for cooperating each with a corresponding aperture of the main damper plate, wherein the outer peripheral surface of the bush is in frictional contact with the inner peripheral edge of said one of the guide rings of the main damper.

5. A damper according to claim 4, wherein the pre-damper is mounted intermediate the face plate and the damper plate of the main damper in the space defined by spacers of the face plate which makes contact with the adjacent face of the damper plate of the main plate.

6. A damper according to claim 5, in which the pre-damper comprising a pre-damper damping plate and two pre-damper guide rings, disposed on either side axially of the damper plate wherein said face plate has axially extending resilient claws which retain said pre-damper guide rings axially in such a way as to create a pre-assembled unit comprising the pre-damper and the bush.

7. A damper according to claim 6, in which said pre-damper dampering plate is rotatable with the hub, and each pre-damper guide ring is extended at its outer periphery, and respectively on either side of each spacer, by two tabs so as to engage the damper plate of the main damper for rotation therewith.

8. A damper according to claim 7, wherein the peripheral surfaces of the pre-damper guide rings are in contact with the inner peripheral surface of the spacers, thereby ensuring that they are centered with respect to the hub.

9. A damper according to claim 7, wherein the face plate has apertures for accommodating damping springs of the pre-damper.

10. A damper according to claim 9, wherein said bush is of plastics material and is made by moulding.

11. A damper according to claim 4, wherein at least the inner edge of said one guide ring of the main damper is bent outwardly for contact with the outer peripheral surface of the bush which is mounted freely onto the hub with a radial clearance for centring, and wherein the other guide ring of the main damper is mounted freely onto the hub with a radial clearance.

* * * * *